United States Patent [19]

Stöhr et al.

[11] Patent Number: 5,097,021
[45] Date of Patent: Mar. 17, 1992

[54] REACTIVE DYESTUFFS WHERE THE REACTIVE RADICAL CARRIES A CYCLIC NITROGEN HETEROCYCLE

[75] Inventors: Frank-Michael Stöhr, Odenthal; Hermann Henk, Cologne; Karl-Josef Herd, Odenthal, all of

[73] Assignee: Bayer Aktiengesellschaft, Leverkusen, Fed. Rep. of Germany

[21] Appl. No.: 677,611

[22] Filed: Mar. 27, 1991

Related U.S. Application Data

[63] Continuation of Ser. No. 246,468, Sep. 19, 1988, abandoned.

[30] Foreign Application Priority Data

Sep. 25, 1987 [DE] Fed. Rep. of Germany ....... 3732381

[51] Int. Cl.$^5$ ................... G09B 62/085; G09B 62/51; D06P 1/38
[52] U.S. Cl. .................. 534/635; 534/632; 544/58.6; 544/60; 544/113; 544/209
[58] Field of Search .................... 534/635, 638

[56] References Cited

U.S. PATENT DOCUMENTS

| | | | |
|---|---|---|---|
| 4,578,457 | 3/1986 | Seiler | 534/632 |
| 4,649,193 | 3/1987 | Meininger et al. | 534/638 X |

FOREIGN PATENT DOCUMENTS

| | | | |
|---|---|---|---|
| 36838 | 9/1981 | European Pat. Off. | 534/635 |
| 0177445 | 4/1986 | European Pat. Off. | 534/638 |
| 2033279 | 1/1972 | Fed. Rep. of Germany | 534/635 |
| 3245525 | 6/1984 | Fed. Rep. of Germany | 534/638 |
| 1274494 | 9/1961 | France | 534/638 |
| 2055880 | 3/1981 | United Kingdom | 534/638 |

*Primary Examiner*—Mary C. Lee
*Assistant Examiner*—Fiona T. Powers
*Attorney, Agent, or Firm*—Sprung, Horn, Kramer & Woods

[57] ABSTRACT

Dyestuffs of the formula

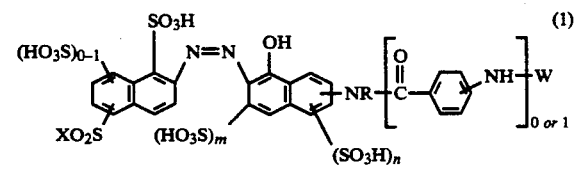

give, on hydroxyl- and amido-containing materials, dyeings having a high fibre-dyestuff bond stability, a high stability to oxidizing agents and good wet fastness properties. The substituents are defined as follows:

$m = 0$ or $1$ $n = 0$ or $1$ where $m + n + n = 1$ or $2$,

X denotes vinyl or $CH_2CH_2-Y$, Y represents $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2C_6H_4CH_3$ AND $N(CH_3)_3{}^+Cl^-$.

$R = H$ or $C_1$–$C_4$-alkyl which is unsubstituted or substituted by OH, halogen, $SO_3H$, $W$ = radical of the formula

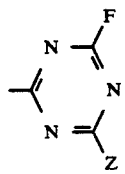

in which

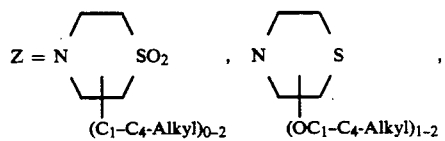

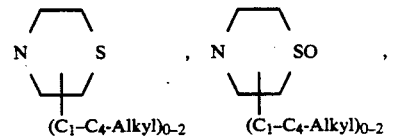

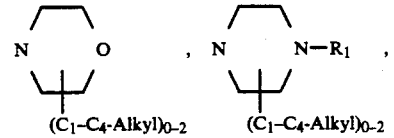

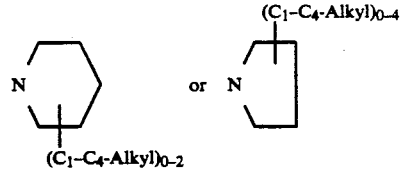

in which
$R_1 = H$ or denotes $C_1$–$C_6$-alkyl which is unsubstituted or substituted by OH, $OSo_3H$, $SO_3H$ or COOH.

4 Claims, No Drawings

REACTIVE DYESTUFFS WHERE THE REACTIVE RADICAL CARRIES A CYCLIC NITROGEN HETEROCYCLE

This application is a continuation of application Ser. No. 246,468, filed Sept. 19, 1988, now abandoned.

The present invention relates to fibre-reactive azo dyestuffs of the formula

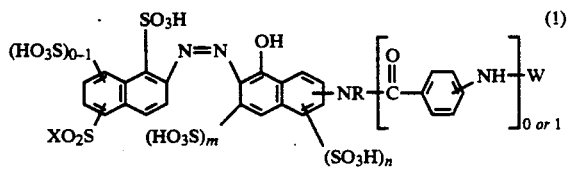

in which
m=0 or 1
n=0 or 1 where $m+n=1$ or 2,
X denotes vinyl or $CH_2CH_2$—Y, Y representing a radical which can be eliminated under alkaline conditions,
R=H or $C_1$-$C_4$-alkyl, it being possible for the alkyl groups to be substituted by OH, halogen, $SO_3H$ or $OSO_3H$.
W=radical of the formula

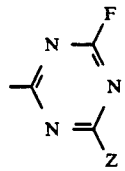

in which

Z =

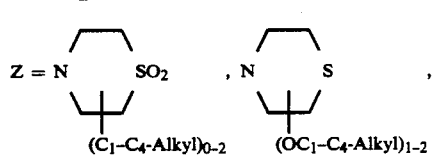

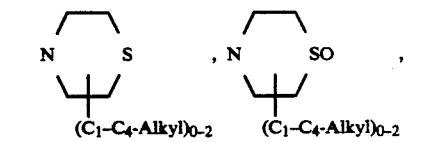

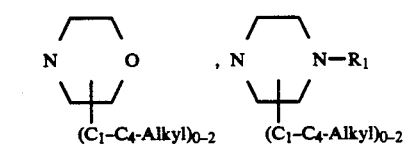

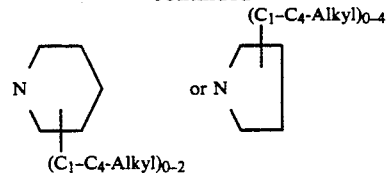

in which
$R_1$=H or denotes optionally substituted $C_1$-$C_6$-alkyl.

Suitable substituents for the alkyl radicals $R_1$ are in particular water-solubilizing substituents such as OH, $OSO_3H$, $SO_3H$ and COOH.

Preferred substituents for $R_1$ are $C_1$-$C_2$-alkyl and $C_2$-$C_4$-hydroxyalkyl. The $C_1$-$C_4$-alkyl radicals can also be substituted, for example by the substituents mentioned for $R_1$.

Examples of Y are: $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2C_6H_4CH_3$ and $N(CH_3)_3{}^+Cl^-$.

Preferred dyestuffs are those of the formula

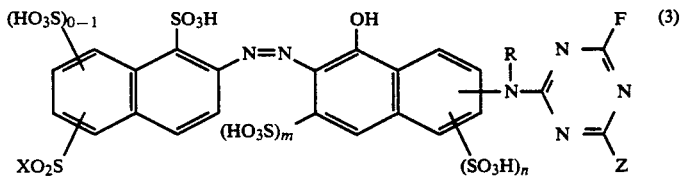

Among these, dyestuffs of the formulae (1) and (3) where R=H or $CH_3$ and $X=CH_2CH_2$—$OSO_3H$ or vinyl should be emphasized. Further preference is given to dyestuffs where Z=morpholine or N-hydroxyethylpiperazine.

Particularly preferred reactive dyestuffs are those of the following formulae (6) to (14) in which
D stands for

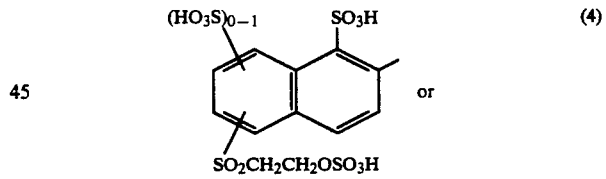

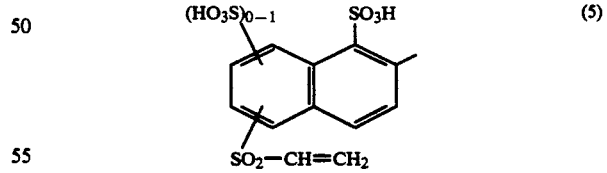

R' stands for hydrogen or methyl and
A stands for

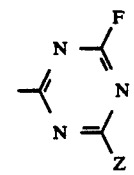

where

Z has the meaning given in formula (1):

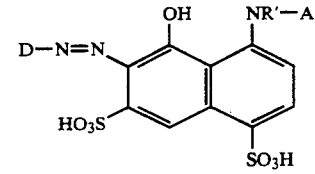 (6)

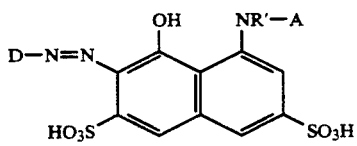 (7)

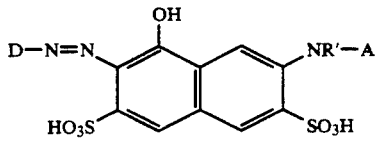 (8)

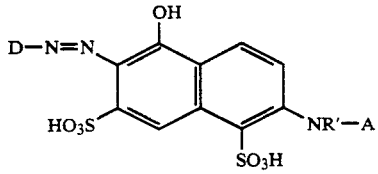 (9)

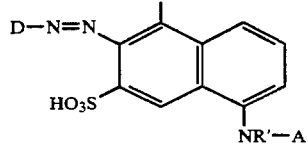 (12)

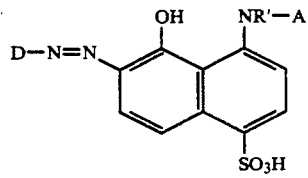 (13)

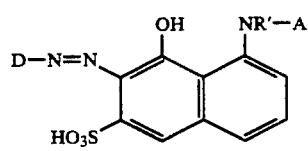 (14)

In the context of dyestuffs (1)–(14), preference is quite generally given to those where R=hydrogen and Z=morpholino.

Very particularly preferred dyestuffs are those of the formulae

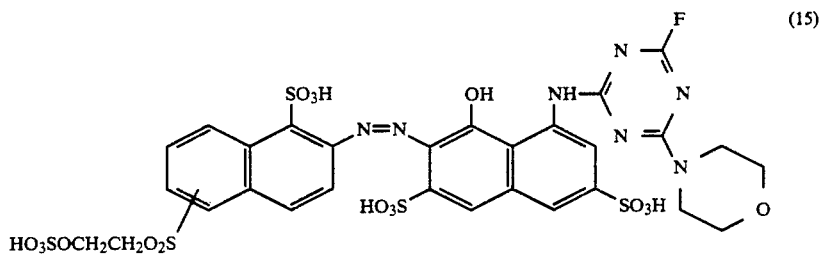 (15)

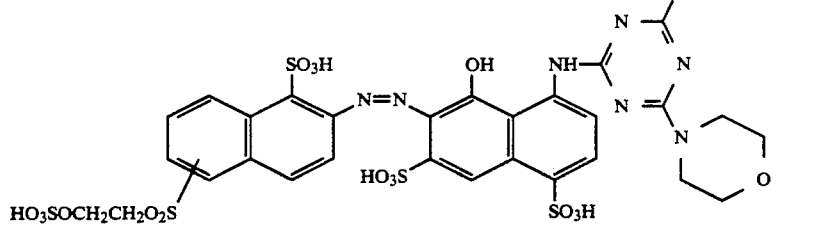 (16)

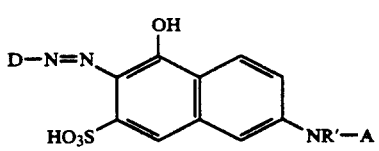 (10)

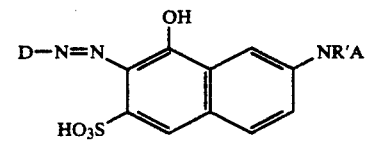 (11)

The novel dyestuffs are suitable for dyeing and printing hydroxyl- and amido-containing materials, in particular cellulose materials. They are distinguished by high reactivity and a high degree of fixation. The dyeings or prints obtainable with these dyestuffs on cellulose materials are furthermore distinguished by a high fibre-dyestuff bond stability and also by a high stability to oxidizing agents, such as peroxide- or chlorine-containing detergents. The small amounts of hydrolysis products formed in dyeing or printing can very easily be washed off. The dyestuffs have good wet fastness properties.

The dyestuffs according to the invention are accessible by preparative processes which are customary in the synthesis of reactive dyestuffs.

Thus, for example, by diazotizing amines of the formula

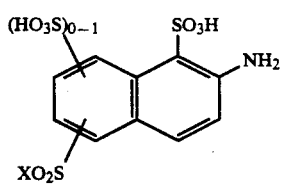 (17)

and coupling the resulting diazonium compounds with hydroxynaphthalenesulphonic acids of the formula (18)

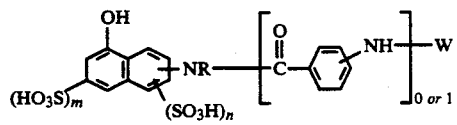 (18)

The preparation of the intermediates (18) is carried out, for example, by condensing aminonaphtholmono- or disulphonic acids or aminobenzoylaminonaphthol- mono- or disulphonic acids at the amine function with trifluorotriazine by known methods (for example European Patent 40,806, German Offenlegungsschrift 2,711,150, European Patent 172,790, German Offenlegungsschrift 2,747,011) and reacting the resulting difluorotriazinyl compounds with amines HZ in the presence of acid-binding agents.

Suitable amines H-Z are for example morpholine, thiomorpholine, piperazine, N-hydroxyethyl-piperazine, N-hydroxypropylpiperazine, piperidine, pyrrolidine, thiomorpholine -1,1-dioxide, 2,6-dimethylmorpholine, 2- or 4-β-hydroxyethylpiperidine and 2-β-hydroxyethylpyrrolidine.

The invention also relates to the novel intermediates of the formulae

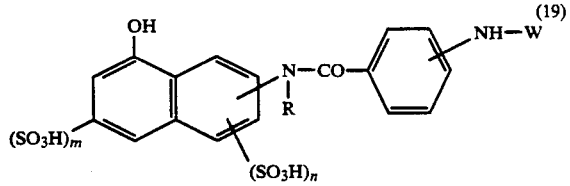 (19)

and also those of the formula

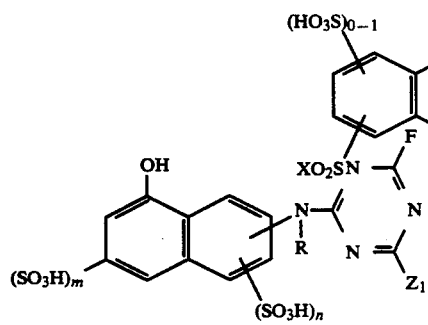 (20)

in which

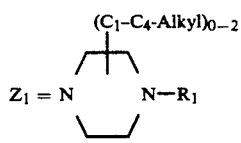

where
$R_1 = C_1-C_6$-alkyl substituted by water-solubilizing substituents;

it being possible for the $C_1-C_4$-alkyl groups to be substituted, preferably by water-solubilizing substituents such as OH, $OSO_3H$, $SO_3H$ and COOH.

Compounds (19) and (20) are prepared as described above.

Details can be obtained from the following examples. Examples of the diazo components (17) are: 2-amino-6-(2-sulphatoethylsulphonyl)(or vinylsulphonyl)-naphthalene-1-sulphonic acid, 2-amino-5-(2-sulphatoethylsulphonyl)(or vinylsulphonyl)-naphthalene-1-sulphonic acid and 2-amino-5-(2-sulphatoethylsulphonyl)(or vinylsulphonyl)-naphthalene-1,7-disulphonic acid.

Another possible route for preparing the dyestuffs of the formula (1) consists in condensing the dye-stuff of the formula

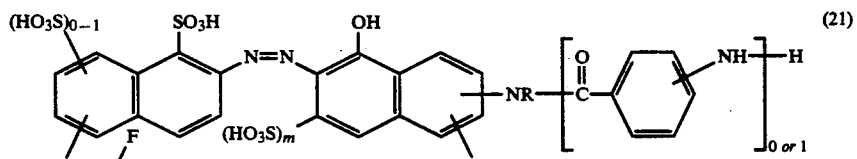 (21)

prepared in a conventional manner (diazotization and coupling) at the amine function with trifluorotriazine and then with amines HZ.

The formulae given are those of the free acids. The preparation usually yields the salts, in particular the alkali metal salts, such as sodium salts, potassium salts or lithium salts.

with 20% strength sodium carbonate solution and the coupling is brought to completion. The dyestuff of the formula

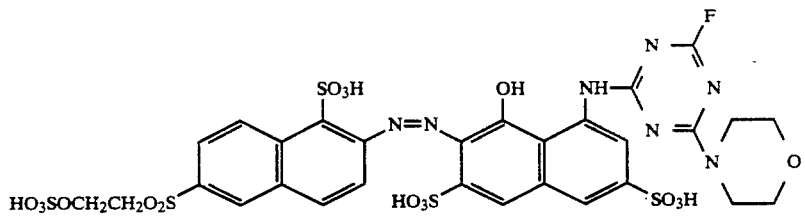

EXAMPLE 1

31.9 g of 1-hydroxy-8-aminonaphthalene-3,6-disulphonic acid are dissolved in 400 ml of water under neutral conditions. 8.8 ml of trifluorotriazine are added to this solution at 0°–5° C. and its pH is kept constant at 4.0–4.5 by the addition of 20% strength sodium carbonate solution. After 5 minutes 9 g of morpholine are added and the pH is kept at 8 with 20% strength sodium carbonate solution. After 10 minutes at 10° C. the reaction is completed. The resulting solution of the compound of the formula is salted out, filtered off with suction, dried and ground. The red dye-stuff powder is readily soluble in water ($\lambda_{max}$=518; 540 nm) and dyes cotton in a brilliant bluish red.

EXAMPLE 2

If in Example 1 morpholine is replaced by an equivalent amount of N-(2-hydroxyethyl)-piperazine and the reaction is otherwise carried out as described in Example 1, the dyestuff of the formula

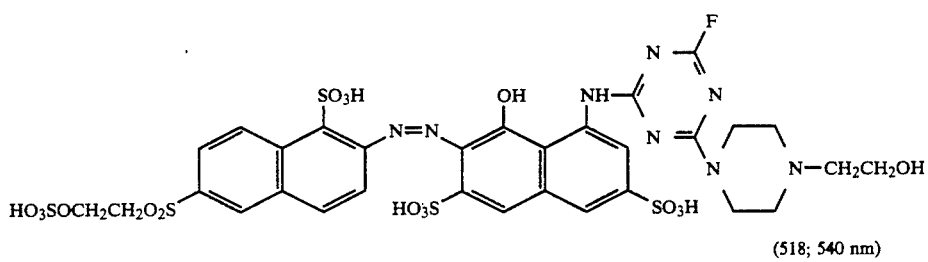

(518; 540 nm)

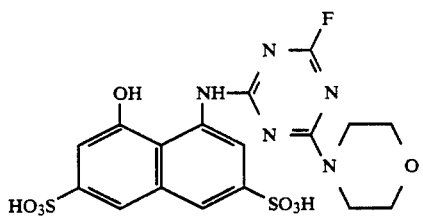

can be converted directly to a brilliant red azo reactive dyestuff by the following method: To the resulting reaction solution is added at 0°–5° C. a suspension of the diazonium salt prepared in the usual manner and obtained by diazotization of 44.2 g of monosodium 2-amino-6-(2-sulphatoethylsulphonyl)naphthalene-1-sulphonate. At the same time, the pH is kept at 7.0–7.5 is obtained which likewise dyes cotton, by an application process customary for reactive dyestuffs, in clear bluish red hues. The use of piperidine or pyrrolidine also leads to valuable red dyestuffs which dye cotton in bright bluish red shades.

EXAMPLE 3

If in Example 1 the 1-hydroxy-8-aminonaphthalene-3,6-disulphonic acid is replaced by the same amount of 1-hydroxy-8-aminonaphthalene-3,5-disulphonic acid and the reaction is carried out analogously to Example 1, the dyestuff of the formula

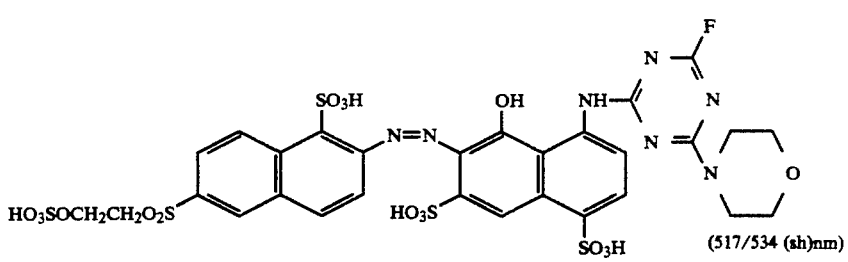

(517/534 (sh)nm)

is obtained which dyes cotton in brilliant red hues.

The use of appropriate starting compounds leads analogously to the following bluish red bifunctional reactive dyestuffs:

EXAMPLE 4

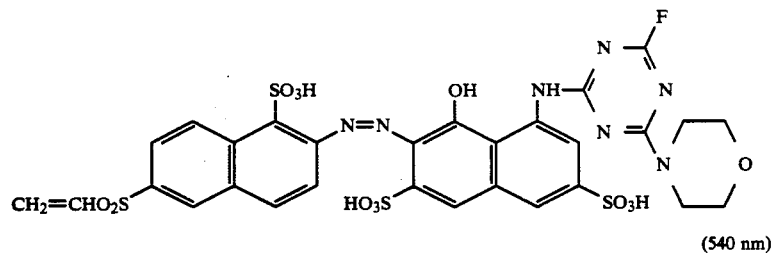
(540 nm)
EXAMPLE 5
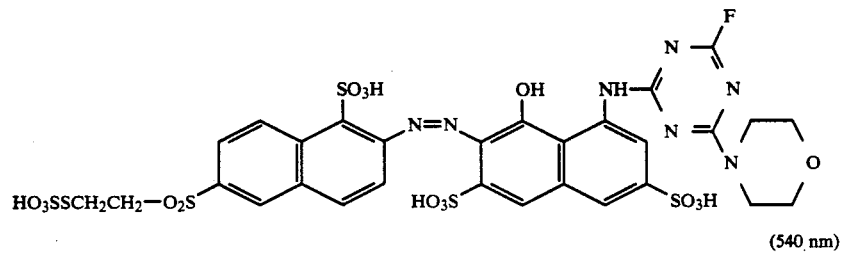
(540 nm)
EXAMPLE 7
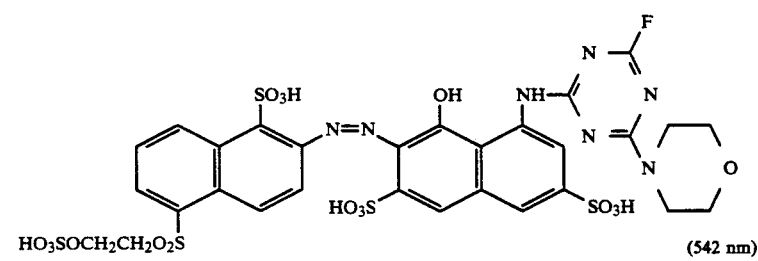
(542 nm)
EXAMPLE 6
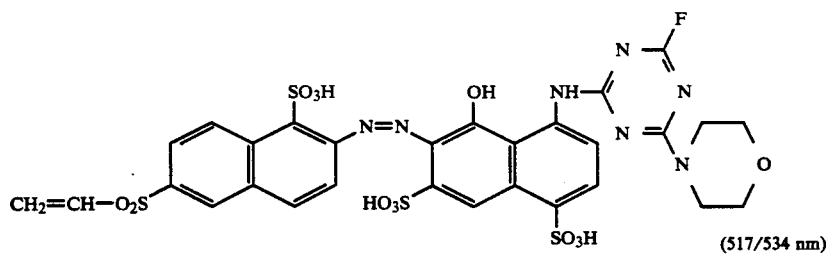
(517/534 nm)
EXAMPLE 8
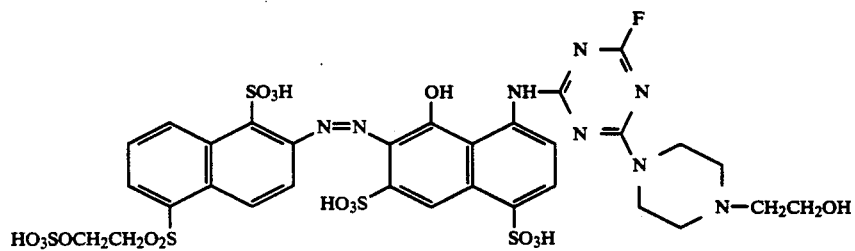

EXAMPLE 9

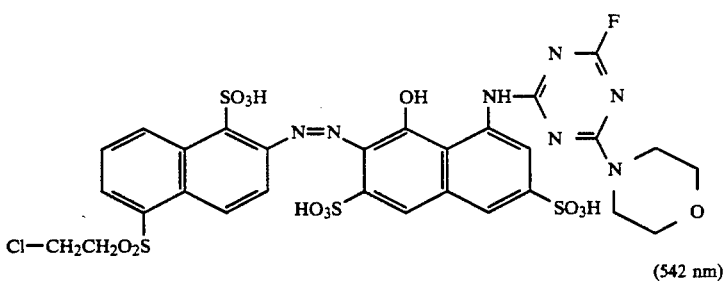

(542 nm)

with suction and dried. The resulting reactive dyestuff of the formula

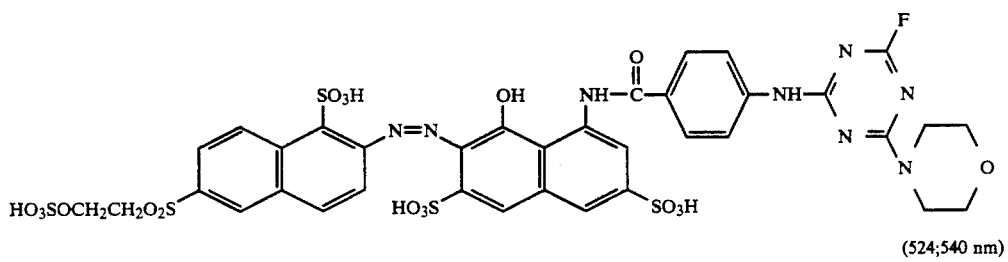

(524;540 nm)

dyes cotton in bright bluish red shades.

If the intermediate is prepared by using, instead of morpholine, corresponding amounts of piperidine, pyrrolidine and N-hydroxyethylpiperazine, intermediates suitable for the following reaction are likewise obtained.

The intermediates can also be isolated in a conventional manner, for example by salting out. Generally, they are obtained in the form of colourless crystalline products.

By varying the coupling component, that is using 1-hydroxy-8-(2-aminobenzoylamino)- or 1-hydroxy-8-(3-aminobenzoylamino)-naphthalenedisulphonic acid analogously to the method of Example 10, the following red dyestuffs are accessible:

EXAMPLE 10

The intermediate of the formula

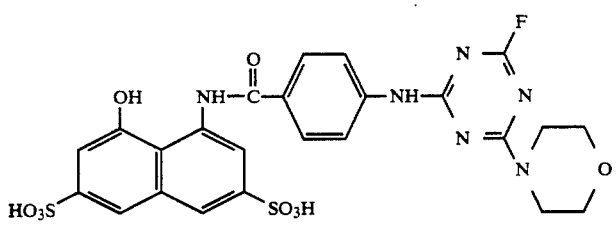

can be prepared by stirring 42.3 g of 1-hydroxy-8-(4-aminobenzylamino)naphthalene-3,6-disulphonic acid in 400 ml of water at a pH of 7, condensing the acid at 0°–5° C. and at a constant pH of 4.0–4.5 with 8.8 ml of trifluorotriazine and finally reacting the mixture at 5°–10° C. and at a pH of 8–9 with 9 g of morpholine. In each of these steps, the pH is kept constant with 20% strength sodium carbonate solution.

To this reaction mixture is added at 0°–5° C. the suspension of the diazonium salt prepared analogously to Example 1 and obtained from 2-amino-6-(2-sulphatoethylsulphonyl)naphthalene-1-sulphonic acid, the pH being maintained between 6.5 and 7.0 by metered addition of potassium bicarbonate solution. Stirring is continued for 30 minutes, the product is salted out with sodium chloride and potassium chloride, filtered off

EXAMPLE 11

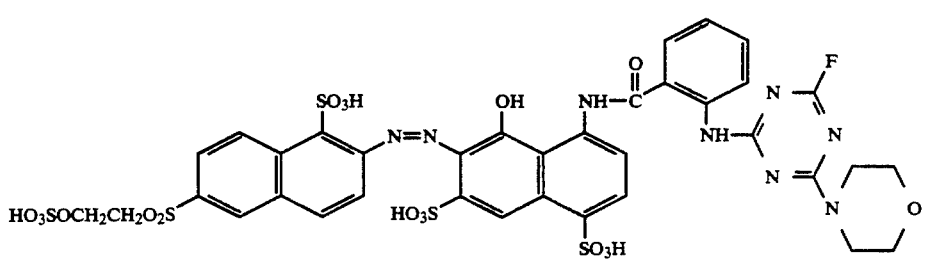

EXAMPLE 12

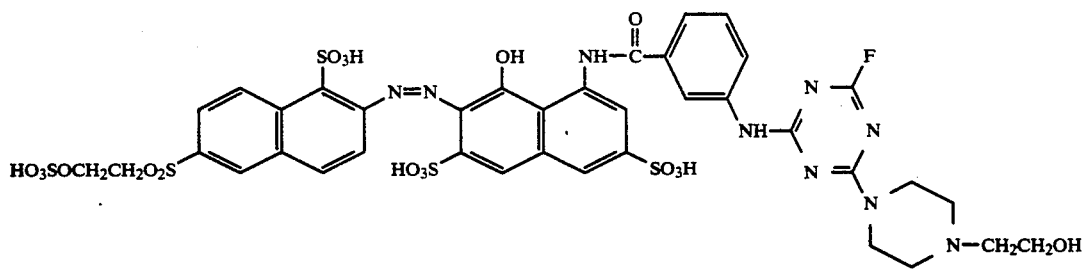

EXAMPLE 13

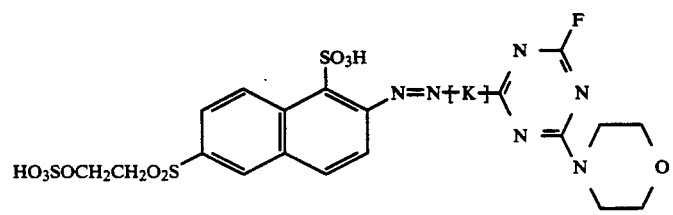

If the 1-hydroxy-8-aminonaphthalene-3,6-disulphonic acid in Example 1 is replaced by an equivalent amount of 1-hydroxy-6-aminonaphthalene-3-sulphonic acid, a dyestuff of the formula

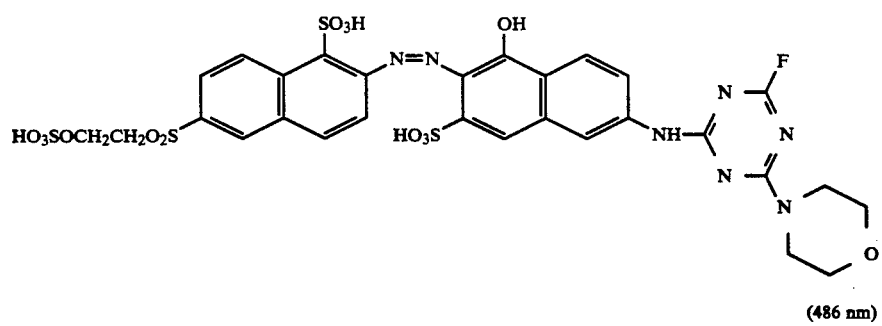

(486 nm)

is obtained which dyes cotton in bright orange shades. Using the same method, the following interesting dyestuffs of the general formula

can be obtained by varying the aminonaphthol coupling component.

TABLE 1

| Example | 14 | 15 | 16 |
|---|---|---|---|
| K |  | 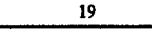 |  |
| Hue [λ$_{max}$] | Yellowish red (408 nm) | orange | red |

TABLE 2

| Example | 17 | 18 | 19 | 20 |
|---|---|---|---|---|
| K | (structure) | (structure) | (structure) | (structure) |
| Hue | red | red | bluish red | orange |

EXAMPLE 21

If the diazo component in Example 13 is replaced by 2-amino-5-(2-sulphatoethylsulphonyl)naphthalene-1,7-disulphonic acid and the reaction is otherwise carried out as described, the dyestuff of the formula

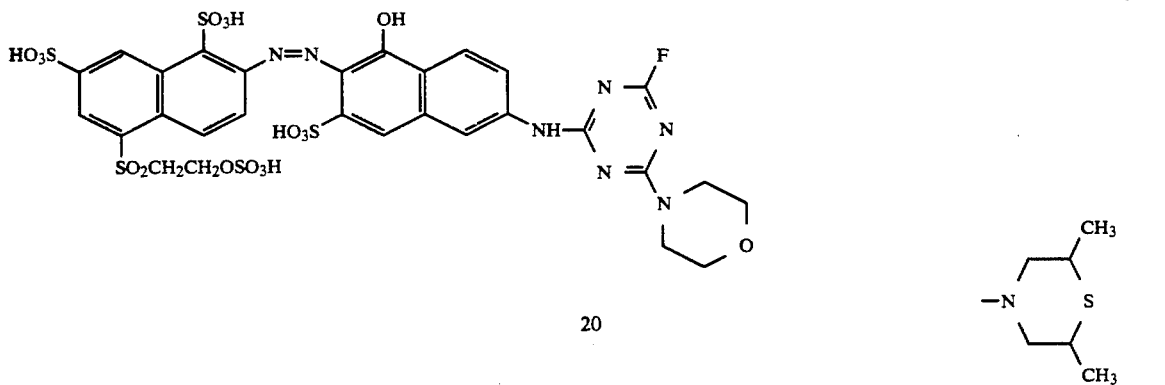

is obtained which dyes cotton in orange shades.

EXAMPLES 22–40

Analogously to Example 1, further interesting coupling components of the general formula can be prepared by using the naphthalenesulphonic acids and amines listed in the following table.

| No. | Position of the sulpho group | Z |
|---|---|---|
| 22 | 6 | —N⟨  ⟩S |
| 23 | 6 | —N⟨CH₃–O–CH₃⟩ |
| 24 | 6 | —N⟨  ⟩SO |
| 25 | 6 | —N⟨  ⟩SO₂ |
| 26 | 6 | —N⟨CH₃–S–CH₃⟩ |
| 27 | 6 | —N⟨  S–OCH₂CH₃⟩ |
| 28 | 6 | —N⟨CH₃–S–CH₃⟩ |
| 29 | 6 | —N⟨CH₃–SO₂–CH₃⟩ |
| 30 | 5 | —N⟨CH₃–SO₂–CH₃⟩ |
| 31 | 5 | —N⟨  ⟩S |
| 32 | 5 | —N⟨CH₃–O–CH₃⟩ |
| 33 | 5 | —N⟨  ⟩SO₂ |

-continued

| No. | Position of the sulpho group | Z |
|---|---|---|
| 34 | 5 | -N(CH(CH3)CH2SCH2CH(CH3)) (2,6-dimethyl-thiomorpholino) |
| 35 | 5 | -N(CH(CH3)CH2SCH2CH(CH3)) (2,6-dimethyl-thiomorpholino isomer) |
| 36 | 6 | -N-piperidinyl-CH2CH2OH |
| 37 | 6 | -N-piperidinyl-CH2CH2OH |

-continued

| No. | Position of the sulpho group | Z |
|---|---|---|
| 38 | 6 | -N-piperidinyl-CH2CH2OH |
| 39 | 5 | -N-piperidinyl-CH2CH2OH |
| 40 | 5 | -N-piperidinyl-CH2CH2OH |

EXAMPLES 41–67

By using the coupling components prepared in Examples 22–40 and the diazo compounds listed in the following table, further important dyestuffs of the formula

D—N=N—K can be prepared.

| No. | D | K = Coupling component from Example | Hue |
|---|---|---|---|
| 41 | naphthalene with SO3H and HO3SOCH2CH2SO2 substituents  | 22 | bluish red |
| 42 | " | 23 | " |
| 43 | " | 24 | " |
| 44 | " | 25 | " |
| 45 | " | 26 | " |
| 46 | " | 27 | " |
| 47 | " | 28 | " |
| 48 | " | 29 | " |
| 49 | " | 30 | red |
| 50 | " | 31 | " |
| 51 | " | 32 | " |
| 52 | " | 33 | " |
| 53 | " | 34 | " |
| 54 | " | 35 | " |
| 55 | naphthalene with SO3H and HO3SOCH2CH2SO2 substituents | 36 | bluish red |
| 56 | " | 37 | " |
| 57 | " | 38 | " |
| 58 | " | 39 | red |
| 59 | " | 40 | " |
| 60 | naphthalene with SO3H and SO2CH2CH2OSO3H substituents | 22 | bluish red |

| No. | D | K = Coupling component from Example | Hue |
|---|---|---|---|
| 61 | " | 23 | " |
| 62 | " | 36 | " |
| 63 | " | 40 | red |
| 64 | 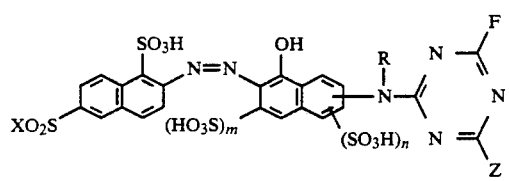 | 22 | bluish red |
| 65 | " | 36 | " |
| 66 | 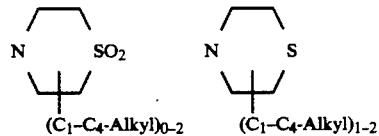 | 22 | bluish red |
| 67 | " | 36 | " |

If the dyestuffs of Examples 41-63 are treated in a known manner with alkali, the corresponding dyestuffs having the group —SO$_2$CH=CH$_2$ are obtained.

We claim:

1. A dyestuff of the formula

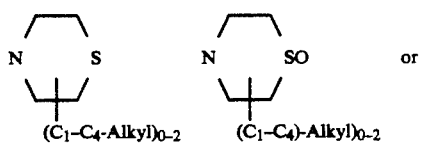

wherein
R=H
m=0 or 1
n=0 or 1 where $m+n=1$ or 2,
X denotes vinyl or CH$_2$CH$_2$-OSO$_3$H, and
Z=

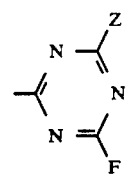

2. A dyestuff of the formula

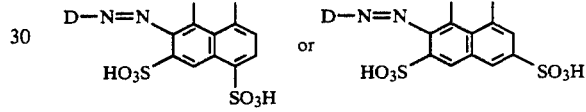

in which
D=

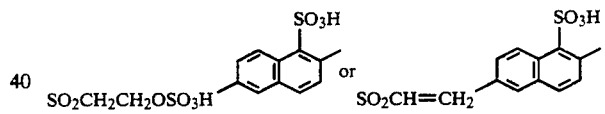

R'=H and
A=

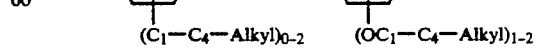

in which
Z=

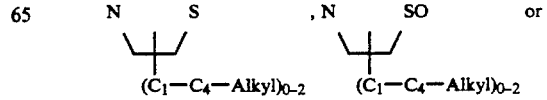

-continued
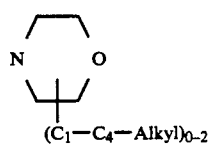
$(C_1-C_4-Alkyl)_{0-2}$
3. A dyestuff of claim 2 where R'=H and Z=
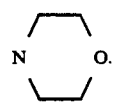
4. A dyestuff of the formula
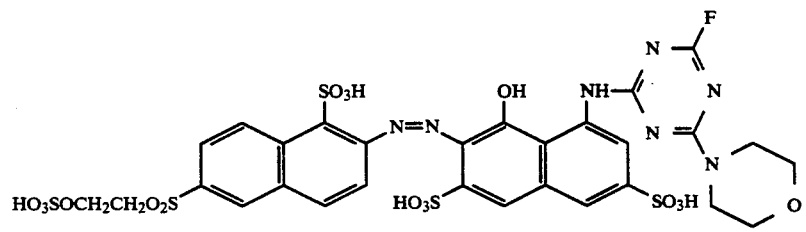
or
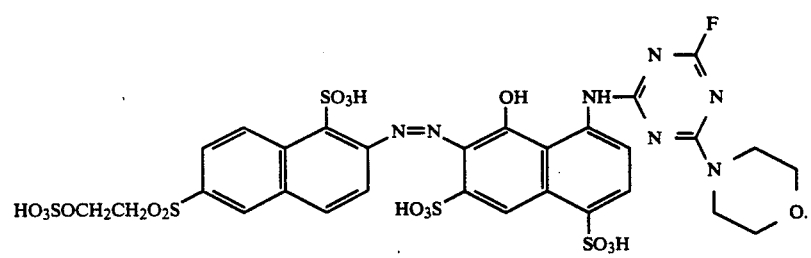
* * * * *

UNITED STATES PATENT AND TRADEMARK OFFICE
CERTIFICATE OF CORRECTION

PATENT NO. : 5,097,021

DATED : March 17, 1992

INVENTOR(S) : Stohr et al.

It is certified that error appears in the above-identified patent and that said Letters Patent is hereby corrected as shown below:

Title Page     ABSTRACT:   Line 8 delete " m+n+n= 1 or 2 " and substitute -- m+n= 1 or 2 --

Signed and Sealed this

Second Day of November, 1993

Attest:

BRUCE LEHMAN

Attesting Officer     Commissioner of Patents and Trademarks